United States Patent [19]
Krapcho

[11] 3,900,478
[45] Aug. 19, 1975

[54] 2-METHYL-2-PIPERIDINO-3'-(TRIFLUOROMETHYL) PROPIOPHENONE

[75] Inventor: John Krapcho, Somerset, N.J.

[73] Assignee: E. R. Squibb & Sons, Inc., Princeton, N.J.

[22] Filed: Jan. 29, 1973

[21] Appl. No.: 327,352

[52] U.S. Cl. ... 260/293.8; 260/293.51; 260/293.78; 260/465.6; 260/651 F; 424/267
[51] Int. Cl.² .................................. C07D 295/00
[58] Field of Search.... 260/293.8, 326.5 J, 247.7 K, 260/570.5 C, 268 R

[56]       References Cited
UNITED STATES PATENTS
3,082,255  3/1963  Stevens et al. .............. 260/570.5 C
3,171,858  3/1965  L'Italien et al. ............ 260/570.5 C
3,694,498  9/1972  Ash et al. .................. 260/570.5 C OTHER PUBLICATIONS
C.A. 60: 10645 b (1964), Duhamel et al.
Recueil des Travaux Chimiques des Pays BAS, 71: 933-44, (1952), MOED et al.
J. Org. Chem., 27: 4392-4396, (1962), Stevens et al.
J. Med. & Pharm. Chem., 1: 121 & 131, (1959), YALE.

Primary Examiner—Sherman D. Winters
Attorney, Agent, or Firm—Lawrence S. Levinson; Merle J. Smith; Burton Rodney

[57]           ABSTRACT
Compounds of the formula

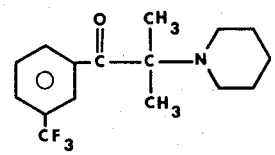

are highly effective immunosuppressive agents and also exhibit anti-inflammatory activity.

2 Claims, No Drawings

2-METHYL-2-PIPERIDINO-3'-(TRIFLUOROMETHYL) PROPIOPHENONE

OBJECTS OF THE INVENTION

It is an object of the present invention to provide new compounds which have immunosuppressive activity. Another object is to provide compounds having anti-inflammatory activity. A further object is to provide a method for the preparation of these compounds. These and other objects of the present invention will be apparent from the following description.

SUMMARY OF THE INVENTION

A compound of the formula

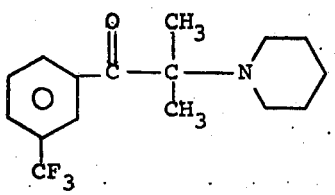

is a highly effective immunosuppressive agent and also exhibits anti-inflammatory activity.

DETAILED DESCRIPTION

Compounds of formula I may be prepared by reacting a trifluoromethylphenyl lithium compound of formula II with a nitrile compound of formula III and subjecting the

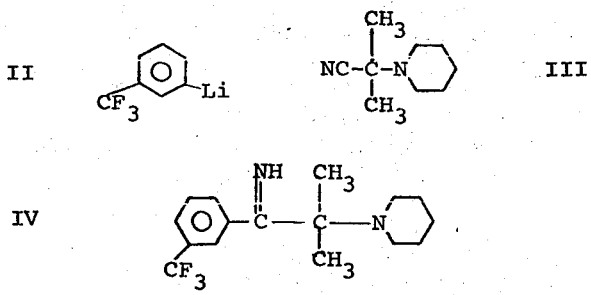

resulting compound of formula IV to hydrolysis under acidic conditions. Compounds of formula II may be prepared by reacting an m-bromobenzotrifluoride with n-butyllithium in hexane at temperatures below about 0°C. Compounds of formula IV may be prepared by adding to the solution of formula II prepared as just described an ether solution of a nitrile compound of formula III (wherein R, R' and B are as previously defined) while maintaining the temperature at from about 0° to about 5°C., and subjecting the resulting lithium complex to mild acidic hydrolysis. Compounds of formula III may be prepared by contacting a hydroxynitrile compound V of the formula

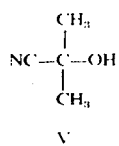

with piperdine. The reaction takes place at ambient temperature and heating is usually applied for a period of from about 1 to about 6 hours to complete the reaction.

The compounds of the present invention have immunosuppressive and anti-inflammatory activity in mammalian species, e.g., mice and rats. For such activity the usual daily dosage is from about 1 mg to about 5 mg per kg of body weight.

The compounds of the present invention in the described dosages may be administered orally; however, other routes such as intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. The amount of active compound in such therapeutically useful compositions or preparations is such that a suitable dosage will be obtained.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The following examples illustrate the present invention without, however, limiting the same thereto. All temperatures are given in degrees Centigrade.

EXAMPLE 1

Part A

1-[2-Imino-1,1-dimethyl-2-(m-trifluoromethylphenyl)ethyl]-piperidine

A solution of 135.0 g of m-bromobenzotrifluoride in 600 ml of ether is stirred and cooled to −10° in an ice-salt bath and treated dropwise, over a period of 15 minutes, with 380 ml of 1.6N n-butyllithium in hexane while maintaining the temperature at −4° to −6°. The solution is stirred for an additional 30 minutes and then treated with 76.0 g of α-piperidinoisobutyronitrile in 300 ml of ether while the temperature is maintained at 0° to 5°. A yellow precipitate separates from the mixture. After standing overnight at room temperature, the mixture is added to a solution of 110 g of NH$_4$Cl in 500 ml of water containing 500 g of ice. The layers are separated and the aqueous phase extracted with 300 ml of ether. The organic phases are combined, dried (MgSO₄), filtered and the solvent evaporated. Fractionation of the residue gives 101.7 g of yellow liquid; bp 125°–130° (0.5 mm).

Part B

2-Methyl-2-piperidino-3'-(trifluoromethyl)propiophenone, hydrochloride

To 55.0 g of material from part A there is added 200 ml of concentrated HCl and the mixture is refluxed for 22 hours. The solution is cooled, treated portionwise with 300 g of K₂CO₃ and diluted with 300 ml of water. The product is extracted with 300 ml of ether (three times) and the ether phases combined, dried (MgSO₄), filtered and the solvent evaporated. Fractionation of the residue gives 44.5 g of the base; bp 100°–105° (0.3 mm).

A solution of 44.1 g of this base in 50 ml of ethanol is treated with 20 ml of 7.4 N HCl in ethanol and the resulting solution is diluted to 500 ml with ether to give 46.8 g of product, mp 197°–199°. After recrystallization from 220 ml of acetonitrile, the colorless product weighs 40.1 g, mp 199°–201°.

EXAMPLE 2

Preparation of capsule formulation

| Ingredient | Milligrams per Capsule |
|---|---|
| 2-Methyl-2-piperidino-3'-(trifluoromethyl)propiophenone, hydrochloride | 40 |
| Starch | 440 |
| Magnesium stearate | 5 |

The active ingredient, starch and magnesium stearate are blended together. The mixture is used to fill hard shell capsules of a suitable size at a fill weight of 485 milligrams per capsule.

EXAMPLE 3

Preparation of tablet formulation

| Ingredient | Milligrams per Tablet |
|---|---|
| 2-Methyl-2-piperidino-3'-(trifluoromethyl)propiophenone, hydrochloride | 30 |
| Lactose | 400 |
| Corn starch (for mix) | 120 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 30 milligrams of active ingredient.

EXAMPLE 4

Preparation of oral syrup formulation

| Ingredient | Amount |
|---|---|
| 2-Methyl-2-piperidino-3'-(trifluoromethyl)propiophenone, hydrochloride | 50 mg. |
| Sorbitol solution (70% N.F.) | 40 ml. |
| Sodium benzoate | 150 mg. |
| Saccharin | 20 mg. |
| Red Dye (F.D. & C. No. 2) | 10 mg. |
| Cherry flavor | 50 mg. |
| Distilled water qs to | 100 ml. |

The sorbitol solution is added to 40 milliliters of distilled water and the active ingredient is suspended therein. The saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

What is claimed is:

1. A compound having the name 2-methyl-2-piperidino-3'-(trifluoromethyl)propiophenone.

2. A compound having the name 2-methyl-2-piperidino-3'-(trifluoromethyl)-propiophenone, hydrochloride.

* * * * *